US008210780B2

(12) United States Patent
Kimura et al.

(10) Patent No.: US 8,210,780 B2
(45) Date of Patent: Jul. 3, 2012

(54) ROUTER

(75) Inventors: Takuji Kimura, Aichi (JP); Atsushi Utsuno, Aichi (JP)

(73) Assignee: Makita Corporation, Anjo (JP)

( * ) Notice: Subject to any disclaimer, the term of this patent is extended or adjusted under 35 U.S.C. 154(b) by 479 days.

(21) Appl. No.: 12/289,448

(22) Filed: Oct. 28, 2008

(65) Prior Publication Data

US 2009/0116923 A1 May 7, 2009

(30) Foreign Application Priority Data

Nov. 1, 2007 (JP) ................................ 2007-285435

(51) Int. Cl.
*B23C 1/20* (2006.01)
*B27C 5/10* (2006.01)

(52) U.S. Cl. .................................. 409/182; 144/136.95

(58) Field of Classification Search .................. 409/181, 409/182, 175; 144/136.95, 136.1, 154.5; *B23C 1/20; B27C 5/10*
See application file for complete search history.

(56) References Cited

U.S. PATENT DOCUMENTS

| | | | | |
|---|---|---|---|---|
| 3,739,824 | A | 6/1973 | Hoenig | |
| 5,253,400 | A * | 10/1993 | Conachen | 29/55 |
| 5,273,089 | A * | 12/1993 | Fuchs et al. | 144/154.5 |
| 5,310,296 | A | 5/1994 | McCurry | |
| 6,488,455 | B1 | 12/2002 | Staebler et al. | |
| 6,637,941 | B2 * | 10/2003 | Greiner | 384/43 |
| 6,863,480 | B1 * | 3/2005 | Taylor | 409/182 |
| 6,955,508 | B1 | 10/2005 | Radcliffe | |
| 2001/0042310 | A1 | 11/2001 | Steele | |
| 2002/0048417 | A1 | 4/2002 | Greiner | |
| 2006/0032553 | A1 | 2/2006 | Williams | |
| 2007/0164086 | A1 | 7/2007 | Hochhalter et al. | |
| 2008/0149222 | A1 | 6/2008 | Zaiser et al. | |
| 2008/0152449 | A1 | 6/2008 | Zaiser et al. | |
| 2008/0152450 | A1 * | 6/2008 | Zaiser et al. | 409/182 |

FOREIGN PATENT DOCUMENTS

| | | | |
|---|---|---|---|
| DE | 10 2006 061 239 | A1 | 6/2008 |
| DE | 10 2006 061 241 | A1 | 6/2008 |
| EP | 1 199 485 | A1 | 4/2002 |
| JP | A-6-328402 | | 11/1994 |

OTHER PUBLICATIONS

Apr. 8, 2011 European Search Report issued in EP 08 01 9135.6.
Vaughan, Robert M. "Big Plunge Routers", Fine Woodworking, Taunton Press, Newton, CT, US, No. 97, Dec. 1992, pp. 46-51.

* cited by examiner

*Primary Examiner* — Erica E Cadugan
(74) *Attorney, Agent, or Firm* — Oliff & Berridge, PLC

(57) ABSTRACT

A router is provided, which includes a main body with a pair of coupling hollows, and a base having a pair of guide shafts standing on. Each of the pair of coupling hollows has an opening facing downward through which a corresponding guide shaft is inserted. A linear ball bearing which serves as a bushing to support a corresponding guide shaft is provided in a lower portion of at least one of the coupling hollows. With this linear ball bearing, the guide shaft can be slid in the coupling hollow smoothly.

9 Claims, 3 Drawing Sheets

Router including First and Second Guide Shafts, Each Supported by a Respective Guide Shaft Bushing, wherein the First Guide Shaft Bushing includes Plural Linear Ball Bearings Arranged in an Axial Direction of a Longitudinal Axis of the First Guide Shaft and wherein the Second Guide Shaft Bushing Does Not Include a Linear Ball Bearing

Fig. 3

Guide Bolt that Extends From the Base, Inside the Second Guide Shaft, to the Nut 18

Fig. 4

ROUTER

BACKGROUND OF THE INVENTION

This application claims the benefit of Japanese Patent Application Number 2007-285435 which were filed on Nov. 1, 2007, the entirety of which is incorporated by reference.

1. Field of the Invention

This invention relates to a router which comprises a base, a pair of guide shafts stood on the base and a main body mounted with a tool pointed downward at an underside thereof, the main body being coupled to the pair of guide shafts in such a manner that the main body is movable upward and downward.

2. Description of Related Art

In the router, typically, for example as disclosed in Japanese Laid-Open Patent Application, Publication No. 6-328402, a pair of columns (guide shafts) are stood on a disk-shaped base, and a main body having a motor housed therein and a downward-pointing tool mounted on an underside thereof is provided with sleeve-like bushings in which the columns can be loosely fitted. The bushings of the main body support the columns whereby the main body is coupled to the columns slidably upward and downward along the columns. A biasing device such as a coil spring is provided between the base and the main body to bias the main body upward. In the normal state, the main body is positioned at an upper-limit position by the biasing device, and is operable to be moved down by means of handles provided on the main body. In operation, thus, an operator sets the base on a workpiece and then lowers the main body by manipulating the handles so that the tool passes through the base to thereby cut the workpiece placed under the base.

The main body of the router constructed as described above is configured to be movable upward and downward with the help of the sleeve-like bearings (bushings) which support the columns. As a result, a friction between the columns and the bushings would possibly hamper a smooth upward and downward movement of the main body in some instances. In particular, when an operator attempts to lower the main body with one hand gripping one of the handles, the main body would be swayed and blocked from moving any longer, which would thus impair the ease of operation of the router. Furthermore, the presence of the backlash structurally inevitably produced between the columns and the bushings would disadvantageously reduce the cutting precision.

Therefore, it would be desirable to provide a router of which a main body is smoothly operable even with one hand when the router is to be moved upward or downward and which is configured to reduce or eliminate the backlash between its guide shafts and bushings provided in the main body, so that the ease of operation and the cutting precision may be improved.

The present invention has been made in an attempt to eliminate the above disadvantages, and illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a router which comprises: a base; a pair of guide shafts stood on the base; and a main body coupled to the guide shafts and being mounted with a tool pointing downward on an underside of the main body, wherein the main body comprises a pair of bushings which are configured to support the guide shafts, and at least one of the bushings includes a linear ball bearing.

In this configuration, optionally, a plurality of linear ball bearings may be used in at least one of the bushings and arranged in an axial direction of a corresponding guide shaft. Additionally or alternatively, a horizontal distance between axes of the pair of guide shafts may be configured to be different from a horizontal distance between axes of the pair of bushings, whereby a preload is horizontally applied to the linear ball bearing included in at least one of the bushings.

According to some embodiments of the present invention, the use of a linear ball bearing in at least one of the bushings renders the main body smoothly operable upward and downward even with one hand, and serves to reduce or eliminate a backlash between the guide shafts and the bushings provided in the main body, so that the ease of operation and the cutting precision can be improved.

In a particular embodiment where a preload is horizontally applied to the linear ball bearing, the backlash between the guide shafts and the bushings provided in the main body can be suppressed more effectively. Consequently, the operation for moving the main body upward and downward can be carried out more smoothly and the cutting precision can be improved more greatly.

BRIEF DESCRIPTION OF THE DRAWINGS

The above aspects, other advantages and further features of the present invention will become more apparent by describing in detail illustrative, non-limiting embodiments thereof with reference to the accompanying drawings, in which:

FIG. 3 is a schematic representation of an arrangement wherein the router includes first and second guide shafts, each supported by a respective guide shaft bushing, wherein the first guide shaft bushing includes plural linear ball bearings arranged in an axial direction of a longitudinal axis of the first guide shaft, and wherein the second guide shaft bushing does not include a linear ball bearing; and FIG. 4 is a schematic representation of a guide bolt that extends from the base, inside the second guide shaft, to the nut 18.

DETAILED DESCRIPTION OF THE EXEMPLARY EMBODIMENTS

Exemplary embodiments of the present invention will be described hereinafter with reference to the accompanying drawings.

Figure 1B:
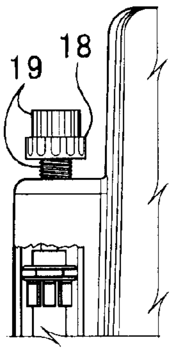
FIG. 1 is a front view of a router according to an exemplary embodiment of the invention.
Figure 1A:
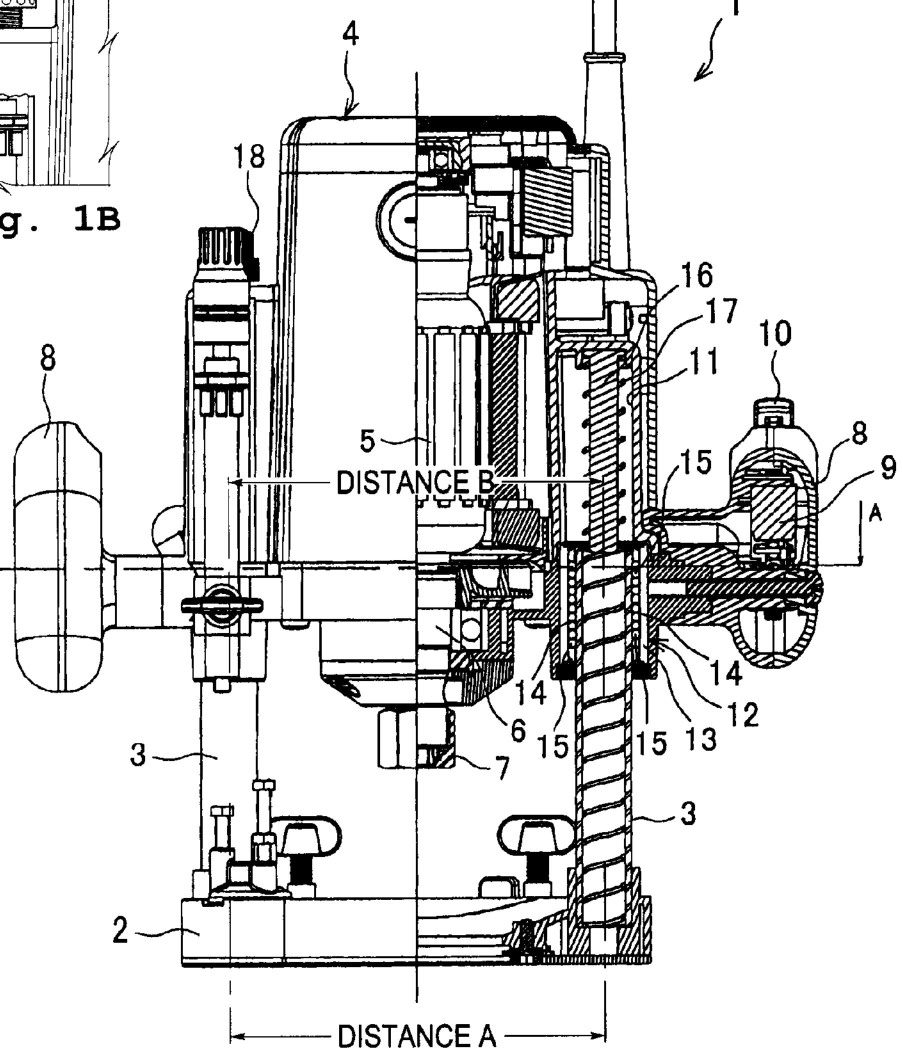
Figure 1C:
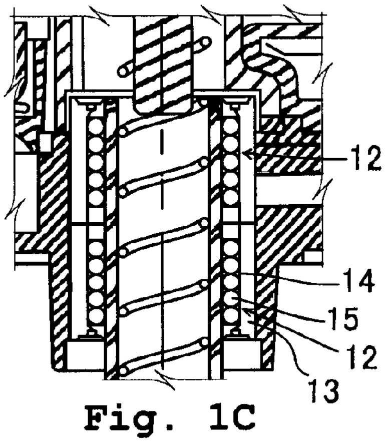
Figure 2:
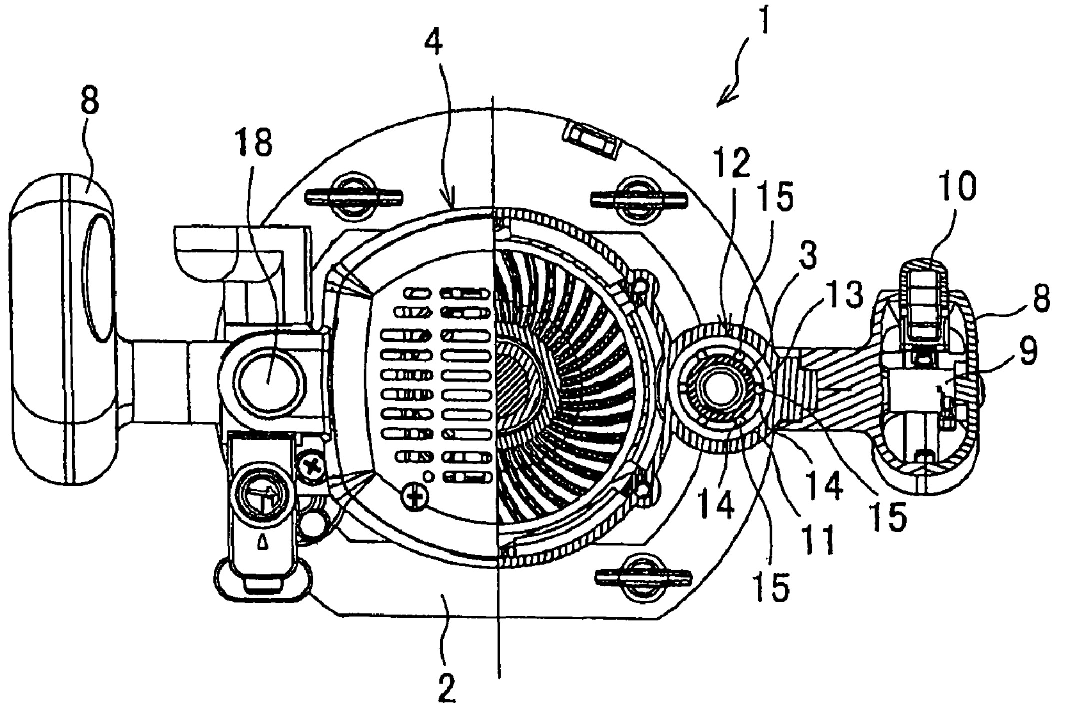
FIG. 2 is a cross-sectional view of the router taken along line A-A of FIG. 1.

In FIG. 1, one example of a router consistent with the present invention is illustrated with a right-side half thereof shown in a vertical section. Referring now to FIGS. 1 and 2, a router 1 comprises a disk-shaped base 2 having an opening at its center, a pair of guide pipes 3 (which serves as a pair of guide shafts) spaced apart laterally and stood upright on an upper surface of the base 2, and a main body 4 coupled to the both guide pipes 3 in such a manner that the main body 4 is allowed to be moved upward and downward. A motor 5 is housed in the main body 4, with its output shaft disposed at a bottom side of the motor, and a spindle 6 coupled to the output shaft projects downwardly from a bottom side of the main body. At a lower end of the spindle 6 a chuck 7 is provided to which a tool (not shown) can be mounted in a detachable manner. Denoted by 8 are handles disposed at both sides of the main body 4. The right handle 8 includes a switch 9 and a push button 10. The switch 9 is configured to activate the motor 5 in response to the push-in operation of the push button 10.

Coupling hollows 11 each of which has an opening facing downward through which a corresponding guide pipe 3 is loosely inserted are formed in the main body 4. A linear ball bearing 12 which serves as a bearing or bushing configured to support the corresponding guide pipe 3 is provided in a lower portion of each of the coupling hollows 11. This linear ball bearing 12 comprises: a cylindrical retainer 13 held in a corresponding coupling hollow 11, the retainer 13 having a plurality of axially elongated retaining holes 14 formed on an inner cylindrical surface of the retainer 13 and arranged circumferentially at regular intervals; and a plurality of steel balls 15 accommodated in each of the retaining holes 14. With the help of this linear ball bearing 12, the guide pipe 3 can be held in the coupling hollow 11 in such a manner that the guide pipe 3 can be slid inside the coupling hollow 11 in an axial direction relative to the coupling hollow 11.

Further, a guide rod 16, which extends downward and is loosely inserted in the corresponding guide pipe 3 through an upper opening thereof, is fixed inside the right coupling hollow 11. A coil spring 17 which is wound around the guide rod 16 is disposed inside the coupling hollow 11 and inside the guide pipe 3. Thus, the main body 4 is biased upward by the coil spring 17. A coil spring 17 is similarly disposed inside the left coupling hollow 11 and inside the corresponding guide pipe 3 (second guide pipe as one example of a second tubular guide shaft). However, the guide rod 16 is not provided in the left coupling hollow 11 and instead, a guide bolt 19 is disposed coaxially with the second guide pipe 3 on the base 2 inside the second guide pipe 3 and extends upward from the base 2 inside the second guide pipe 3 and further inside the main body 4 (left coupling hollow 11). The guide bolt 19 has an upper end portion projecting upward from the main body 4, and a thumb nut 18 is screwed on the upper end portion of the guide bolt 19. The thumb nut 18 screwed on the upper end portion of the guide bolt 19 is configured to come in contact with an upper surface of the main body 4 when the main body 4 is released and pushed up by the coil spring 17, so as to block an upward movement of the main body 4.

In operation, where the router 1 constructed as described above is used, an operator mounts a tool to the chuck 7, sets the base 2 on a workpiece, grips the handles 8 and depresses the push button 10 to turn on the switch 9, thereby activating the motor 5 to spin the tool while the operator lowers the main body 4 with the handles 8 against the biasing force of the coil spring 17. Accordingly, the workpiece under the base 2 can be cut by means of the tool passing through the center of the base 2. When the cutting operation is completed and the operator releases his/her hands from the handles 8, the main body 4 is moved upward by the biasing force of the coil spring 17 to an upper-limit position in which the main body 4 is brought into contact with the thumb nut 18.

During this operation, the upward and downward movement of the main body 4 can be performed smoothly because the movement is guided by the linear ball bearings 12 sliding on the outer cylindrical surfaces of the guide pipes 3. Therefore, the main body 4 can be lowered without obstruction even when the operator grips the right handle 8 only, for example.

As described above, in the router 1 according to the present embodiment, the use of a linear ball bearings 12 as the bushings for the guide pipes 3 in the main body 4 renders the main body 4 smoothly operable even with one hand when it is moved upward and downward. Further, a backlash between the guide pipes 3 and the linear ball bearings 12 is reduced or eliminated, so that the ease of operation and the cutting precision can be improved.

Although the exemplary embodiment of the present invention has been described above, the present invention is not limited to the illustrated embodiment, and may be carried out into practice in various other ways. Therefore, it is contemplated that various modifications and changes may be made to the exemplary embodiment of the invention without departing from the scope of the embodiments of the present invention as defined in the appended claims.

For example, in the above embodiment a linear ball bearing is used as the bushing for the both of a pair of guide pipes; however, an alternative embodiment may be configured such that only one of the bushings includes a linear ball bearing and the other bushing is implemented as being of a conventional sleeve-like type or others which are not linear ball bearings. In this embodiment where a linear ball bearing is provided in either one of the bushings, for example, an appropriate adjustment may preferably be made in the interference of a blocking member for press-fitting a retainer into the coupling hollow from below and holding the same in a definite position, to thereby apply a preload to the linear ball bearing. The preload applied to the linear ball bearing may thus serve to suppress a backlash of steel balls of the linear ball bearing, so that the main body can be moved upward and downward more smoothly.

Although only one unit of the linear ball bearing is provided in each coupling hollow in the above-described embodiment, two or more linear ball bearing units may be arranged in an axial direction of a corresponding guide pipe (guide shaft) which is to be supported by the two or more linear ball bearing units. The increase in the number of the linear ball bearing units may contribute to a smoother and more stable operation of upward and downward movement of the main body.

Furthermore, the guide shaft may not necessarily be in the form of a hollow cylinder like a guide pipe as illustrated in the present embodiment, but a solid column may be used in the present invention.

Optionally, a router according to another exemplary embodiment of the present invention may be configured such that horizontal distances between axes of a pair of guide shafts as defined in the base and between axes of a pair of bushings as defined in the main body have a slight difference instead of being identical whereby a preload is horizontally applied to the linear ball bearings included in the bushings by which the guide shafts are supported. In this particular configuration, a backlash between each guide shaft and the linear ball bearing can be suppressed more effectively, and the operation for moving the main body upward and downward can be carried out more smoothly. As a result, the cutting precision can be improved significantly. These advantages may also apply to the embodiments where the linear ball bearing is employed in either one of the bushings.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A router comprising:

a base;

a first guide shaft and a second guide shaft, both stood on the base;

a main body coupled to the guide shafts, the main body comprising a first guide shaft bushing and a second guide shaft bushing, the first guide shaft bushing configured to support the first guide shaft and the second guide bushing configured to support the second guide shaft;

a chuck disposed on an underside of the main body, the chuck being configured to detachably mount a tool pointing downward; and a guide bolt stood in a position on the base so as to extend from the base towards the main body at a position inside the second guide shaft, wherein the first guide shaft bushing comprises at least one linear ball bearing and the second guide shaft bushing does not comprise a linear ball bearing.

2. The router according to claim 1, wherein the at least one linear ball bearing of the first guide shaft bushing comprises a plurality of linear ball bearings arranged in an axial direction of a longitudinal axis of the first guide shaft.

3. The router according to claim 1, wherein the main body further comprises a first guide shaft coupling hollow and a second guide shaft coupling hollow each having an opening facing downward through which a corresponding guide shaft is inserted, and the at least one linear ball bearing of the first guide shaft bushing comprises a linear ball bearing that is provided in a lower portion of the first guide shaft coupling hollow.

4. The router according to claim 3, wherein the linear ball bearing that is provided in the lower portion of the first guide shaft coupling hollow comprises:

a cylindrical retainer held in the first guide shaft coupling hollow, the retainer comprising a plurality of axially elongated retaining holes arranged so as to be elongated in an axial direction of a longitudinal axis of the first guide shaft and arranged circumferentially at regular intervals on an inner cylindrical surface of the retainer, and a plurality of steel balls accommodated in each of the axially elongated retaining holes.

5. The router according to claim 1, wherein at least one of the guide shafts is tubular.

6. The router according to claim 1, wherein the main body further comprises:

a first guide shaft coupling hollow and a second guide shaft coupling hollow each having an opening facing downward, the first guide shaft extending through the opening in the first guide shaft coupling hollow, and the second guide shaft extending through the opening in the second guide shaft coupling hollow;

a guide rod fixed inside the first guide shaft coupling hollow, the guide rod extending downward from an upper portion of the coupling hollow and being inserted in the first guide shaft through an upper opening of the first guide shaft, the first guide shaft being tubular; and a coil spring wound around the guide rod and disposed inside the first guide shaft coupling hollow and inside the first guide shaft, whereby the main body is biased upward by the coil spring.

7. The router according to claim 6, wherein the guide bolt has an upper end portion which is threaded, the router further comprising:

a nut configured to be screwable onto the threaded upper end portion of the guide bolt, wherein:

the second guide shaft is tubular; and the second coupling hollow has an opening through which the guide bolt extending from the base inside the second guide shaft projects upward, so that the nut screwed on the upper end portion of the guide bolt is brought into contact with an upper surface of the main body to block an upward movement of the main body.

8. The router according to claim 1, wherein the main body further comprises handles which are disposed at right and left sides of the main body.

9. The router according to claim 1, further comprising a coil spring disposed at least partially inside the first guide shaft.

* * * * *